(12) United States Patent
Dove

(10) Patent No.: US 7,340,511 B2
(45) Date of Patent: *Mar. 4, 2008

(54) APPARATUS AND METHOD FOR CONFIGURING NETWORK MEDIA CONNECTIONS

(75) Inventor: Daniel J. Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 569 days.

This patent is subject to a terminal disclaimer.

(21) Appl. No.: 10/829,522

(22) Filed: Apr. 21, 2004

(65) Prior Publication Data

US 2004/0198105 A1    Oct. 7, 2004

Related U.S. Application Data

(63) Continuation of application No. 10/099,372, filed on Mar. 12, 2002, which is a continuation-in-part of application No. 09/691,726, filed on Oct. 18, 2000, now Pat. No. 6,460,078, which is a continuation of application No. 09/190,695, filed on Nov. 12, 1998, now Pat. No. 6,175,865.

(51) Int. Cl.
    *G06F 13/00* (2006.01)
(52) U.S. Cl. .................................. 709/220
(58) Field of Classification Search .............. 370/254, 370/431, 445, 449, 450; 709/200, 220, 227, 709/250

See application file for complete search history.

(56) References Cited

U.S. PATENT DOCUMENTS

| | | | | |
|---|---|---|---|---|
| 5,410,535 A | * | 4/1995 | Yang et al. ................ | 713/1 |
| 5,577,023 A | * | 11/1996 | Marum et al. ............. | 370/225 |
| 5,892,926 A | * | 4/1999 | Witkowski et al. ......... | 710/100 |
| 5,923,663 A | * | 7/1999 | Bontemps et al. .......... | 370/445 |
| 6,175,865 B1 | * | 1/2001 | Dove et al. ................. | 709/220 |
| 6,460,078 B1 | * | 10/2002 | Dove et al. ................. | 709/220 |
| 6,661,805 B1 | * | 12/2003 | Romano et al. ............ | 370/450 |
| 6,684,347 B1 | * | 1/2004 | Coffey ....................... | 714/43 |
| 6,874,041 B1 | * | 3/2005 | Burd et al. .................. | 710/38 |

OTHER PUBLICATIONS

"2KNE100TX cards, no hub/switch, options?" by E. Jorgensen, Apr. 18, 2000. Total pp. 2.
"Linux Cross Reference:Linux/drivers/net/tlan.c" version 2.2.19-pre-mk1 by J. Banks. Total pp. 44.
"MII-TOOL" Manpage of MII-TOOL by D. Hinds, et al., Apr. 25, 2000. Total pp. 3.
"Sun hme driver FAQ", updated Jan. 1998. Total pp. 5.
"Table 22-7 control register bit definitions" IEEE 802.3u (1995). Total pp. 1.
"DP83840 10/100 Mb/s Ethernet Physical Layer", Nov. 1995. © 1996 National Semiconductor Corp. http://www.national.com. Total pp. 56.
"hme-SUNW,hme Fast-Ethernet device driver" UNIX man pages:hme(7d). Retrieved on Feb. 26, 2007. Retrieved from the internet: http://bama.edu.cgi-bin/man-cgi?hme+7d. Total pp. 6.

* cited by examiner

*Primary Examiner*—Dmitry Levitan

(57) ABSTRACT

A method of automatically configuring media connections, includes: connecting a first pair of connectors to a first pair of conductors and a second pair of connectors to a second pair of conductors during a first state, and connecting the first pair of connectors to the second pair of conductors and the second pair of connectors to the first pair of conductors during a second state. An apparatus for automatically configuring media connections, includes: a media switch.

73 Claims, 7 Drawing Sheets

| CONTACT | PHY | MDI | MDI-X |
|---|---|---|---|
| 1 | B1_DA+ | B1_DA+  32 | B1_DB+  34 |
| 2 | B1_DA- | B1_DA-  32 | B1_DB-  34 |
| 3 | B1_DB+ | B1_DB+  34 | B1_DA+  32 |
| 4 | B1_DC+ | B1_DC+ | B1_DD+ |
| 5 | B1_DC- | B1_DC- | B1_DD- |
| 6 | B1_DB- | B1_DB-  34 | B1_DA-  32 |
| 7 | B1_DD+ | B1_DD+ | B1_DC+ |
| 8 | B1_DD- | B1_DD- | B1_DC- |

FIGURE 4

APPARATUS AND METHOD FOR CONFIGURING NETWORK MEDIA CONNECTIONS

CROSS-REFERENCE TO RELATED APPLICATIONS

This application is a continuation of U.S. patent application having Ser. No. 10/099,372, filed Mar. 12, 2002, which is a continuation-in-part of U.S. patent application having Ser. No. 09/691,726, filed on Oct. 18, 2000 now U.S. Pat. No. 6,460,078, which is a continuation of U.S. patent application having Ser. No. 09/190,695, filed on no Nov. 12, 1998 now U.S. Pat. No. 6,175,865. Benefit of all earlier filing dates is claimed for all common subject matter. U.S. patent application Ser. No. 10/099,372, U.S. Pat. No. 6,460,078, and U.S. Pat. No. 6,175,865 are each hereby fully incorporated herein by reference.

TECHNICAL FIELD

This disclosure relates generally to communication networks, and more particularly to an apparatus and method for automatically switching media connections when operating in forced speed and duplex mode.

BACKGROUND

Many local area network (LAN) products use a medium formed by twisted copper wire pairs for the transmission and reception of data. For these products, there is typically a requirement to use one or more pairs for the transmission of data, and one or more pairs to receive the data. For LAN technologies which employ a full-duplex medium, many have different pairs for transmission and for reception and thereby require that each end of the link use a defined assignment for its twisted pair connector to a particular pair of wires. For example, a Network Interface Card (NIC) is usually employed as an end node device, while a switch or repeater will be employed as a concentrator or central component in a star-based network. In order for the link to operate, the NIC must transmit on a pair of wires that is connected to the receiver of the hub or switch and the NIC's receiver must be connected to the transmitter at the other end of the link. If the transmit pair of wires of a device is connected to the transmit connectors of the connected device, the communication link will typically fail.

Most LAN standards address this by assigning different connector pins to the wires in the twisted pair cable which is typically referred to as the Media Dependent Interface (MDI). In the IEEE-802.3's 10BASE-T standard, an end node will assign pins 1 and 2 to the transmit pair, while pins 3 and 6 are for connection to a twisted pair for receiving. The repeater for a 10BASE-T network will assign its transmitter to pins 3 and 6, while its receiver will be connected to pins 1 and 2. This works very well for general configurations where NICs are attached to repeaters. However, there are a few cases that become more important to consider as the emergence of switched networks takes place. First, there is a case where the NIC is connected directly to another NIC, or a repeater is connected to repeater, or a repeater is connected to a switch. Depending on the assignment of pins at the product's network interface, it may become necessary to employ a "crossover" cable to address the fact that both products employ the same pin designations on their interfaces.

Some products will use a manual "MDIX" (Media Dependent Interface Crossover) switch that allows them to connect to other similar devices but requires an installer to manually push a button. This approach works well for very limited applications like a repeater-to-repeater port but it would not work well in the general case where it is desired to build a product that attaches to either repeater, NIC, or switch without manual intervention. To overcome this drawback, a new approach must be used.

In a prior product known as the 100VG Modular Transceiver from Hewlett-Packard Company, bus switches were employed to make a solid-state version of this type of circuit. However, that prior product used a very low frequency alternating pin selection to perform its "automatic" operation. While the algorithm in the product was suitable for its intended purpose, it had the drawback that if two such devices were attached together, they could potentially get into a "lock-step" operation where the necessary connection for establishing a communication link became impossible. Subsequently, other products came out which employed a similar algorithm and were forced to use a different alternation rate to avoid the lock-step phenomena. While that approach was suitable for its intended purpose and worked for a very limited set of products, it did not solve the general case whereby a guaranteed connection between nodes was achieved regardless of the manufacturer or the model of the product that was being used. Therefore, to guarantee (or at least assure a very high probability of) connection, another method is needed to avoid the "lock-step" interaction between automatic crossover circuits.

SUMMARY

In accordance with an embodiment of the invention, a method of automatically configuring media connections when operating in forced speed and duplex mode, includes: connecting a first pair of connectors to a first pair of conductors and a second pair of connectors to a second pair of conductors during a first state, and connecting the first pair of connectors to the second pair of conductors and the second pair of connectors to the first pair of conductors during a second state; and holding the first state or the second state if operating in forced speed and duplex mode, a defined time has not expired and another end of a link can receive a signal.

In another embodiment of the invention, an apparatus for automatically configuring media connections when operating in forced speed and duplex mode, includes: a media switch configured to connect a first pair of connectors to a first pair of conductors and a second pair of connectors to a second pair of conductors during a first state, and to connect the first pair of connectors to the second pair of conductors and the second pair of connectors to the first pair of conductors during a second state; and a processor coupled to the media switch and configured to hold the first state or the second state if operating in forced speed and duplex mode, a defined time has not expired and another end of a link can receive a signal.

In another embodiment of the invention, a method of using an existing auto-MDI/MDIX function when operating in forced speed and duplex mode, includes: putting a chip an auto-negotiation mode, and advertising a desired state; performing the auto-MDI/MDIX function; when a link is up, reading a MDI/MDIX state from a status register, where the MDI/MDIX state indicates the state of the other end of the link; dropping the link; forcing the MDI/MDIX state to the state found in the status register; and forcing the speed and duplex mode.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 is a table identifying the assignment of PHY signals (B1 DA+ to B1 DD−) to MDI and MDIX pin identification and configuration.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
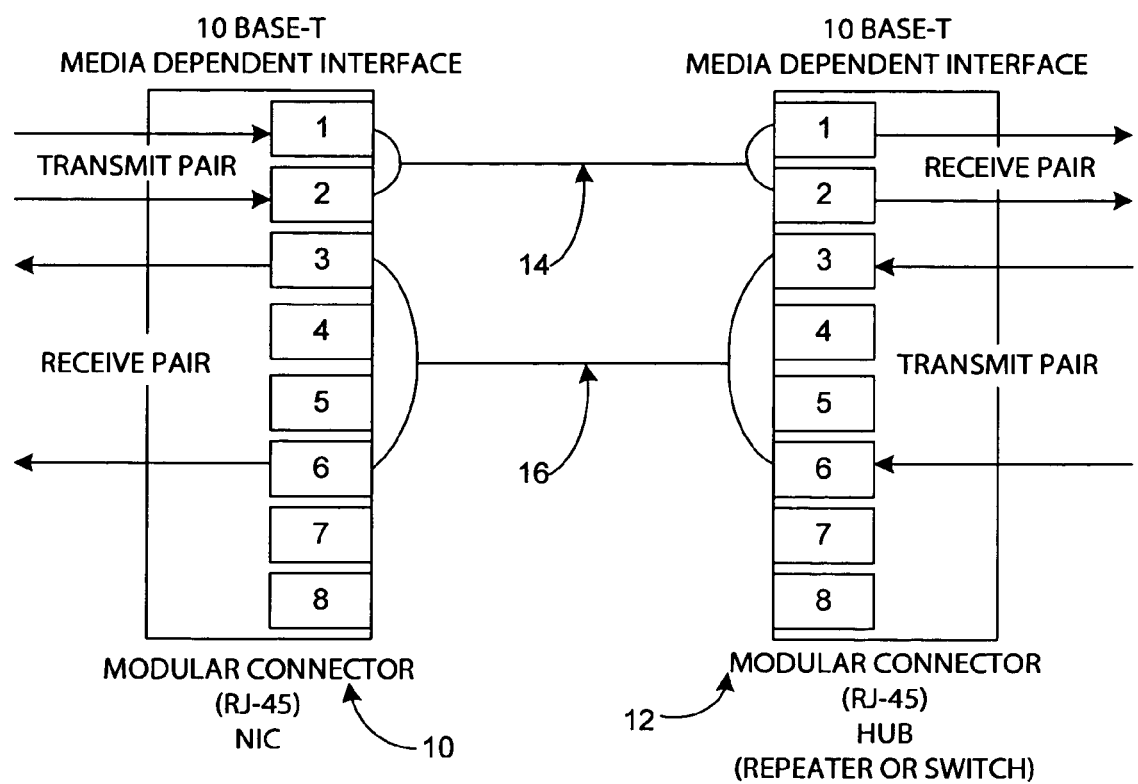
FIG. 1 is a schematic diagram showing a media dependent interface (MDI) 10BASE-T network interface card (NIC) connected to a similar hub interface card.
Figure 2:
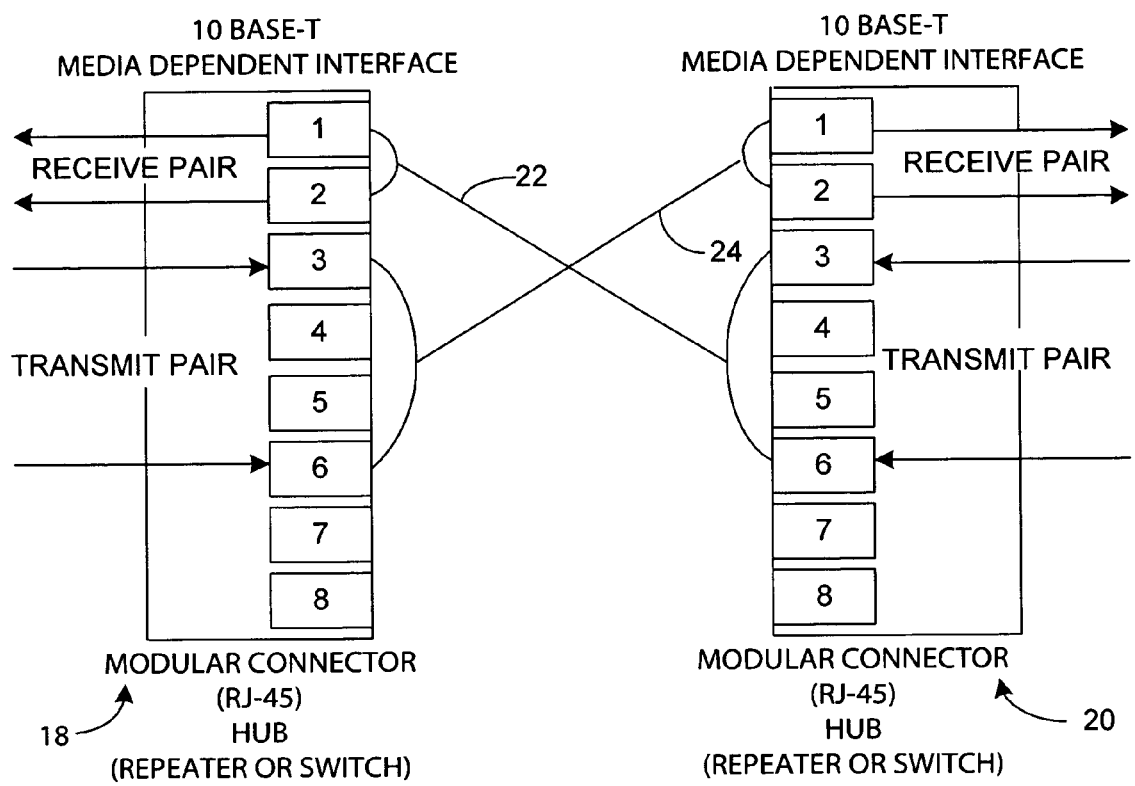
FIG. 2 is a schematic diagram showing two 10BASE-T media dependent interface hubs connected together with a crossover connection to establish and maintain the communication links.

Referring in detail now to the drawings where similar parts or actions of an embodiment of the invention are identified by like reference numerals, and initially referencing FIGS. 1 and 2 for background information only, FIG. 1 shows a schematic diagram of a 10BASE-T media dependent interface (MDI), with a network interface card indicated generally at 10, being shown on the left, and with a similar hub interface indicated generally at 12 shown on the right. The transmit pair of connectors of the NIC 10 has pins 1 and 2 connected to pins 1 and 2 of the hub 12 by a twisted pair cable 14. The receive connectors for the NIC 10 are pins 3 and 6 whereas the transmit pair of the hub 12 are pins 3 and 6 and are interconnected with a twisted pair cable 16.

As shown in FIG. 2, another configuration is illustrated with a hub (repeater or switch) 18 being interconnected with another similar hub (repeater or switch) 20. In this instance, a crossover connection is typically necessary so that the receive pins 1 and 2 of the hub 18 are connected by the twisted pair 22 to the transmit pair 3 and 6 of the hub 20. Similarly, transmit connectors 3 and 6 of the hub 18 are connected to receive connectors 1 and 2 of the hub 20 by the twisted pair 24.

It is noted that U.S. Pat. No. 6,175,865, by Daniel J. Dove and Bruce W. Melvin, issued on Jan. 16, 2001, discloses a method and apparatus for solving the problem of lock-step interaction of the automatic crossover circuits by introducing a pseudo-random and a random element to the crossover switch control. U.S. Pat. No. 6,175,865 is fully incorporated herein by reference. The method and apparatus disclosed in U.S. Pat. No. 6,175,865 use the pseudo-random element, in addition to the actual random element, to provide an implementation of an auto-MDI/MDIX algorithm that is virtually impossible to be placed in a lock step condition.

However, there are particular devices that do not follow the IEEE 802.3 Auto-Negotiation Protocol, and are instead forced into either 10 Mbps or 100 Mbps operation. Customers who use the Auto-MDI/MDIX algorithm have grown used to not requiring special crossover cables with products that implement the algorithm. When they force speed/duplex for some limited applications, the algorithm breaks down and link is not established. The root of the problem lies in the Auto-Negotiation state machine which turns off an auto-negotiating (AN) transmitter if it detects non-FLP (non Fast Link Pulse) energy on the wire (as occurring during forced mode). When that AN transmitter is turned off, it will cause the Auto-MDI/MDIX node to incorrectly determine its link state and cycle endlessly. The logical elements described below will allow operation of Auto-MDI/MDIX with nodes that are Auto-Negotiating even when the node in question is operated in forced mode.

Figure 3:
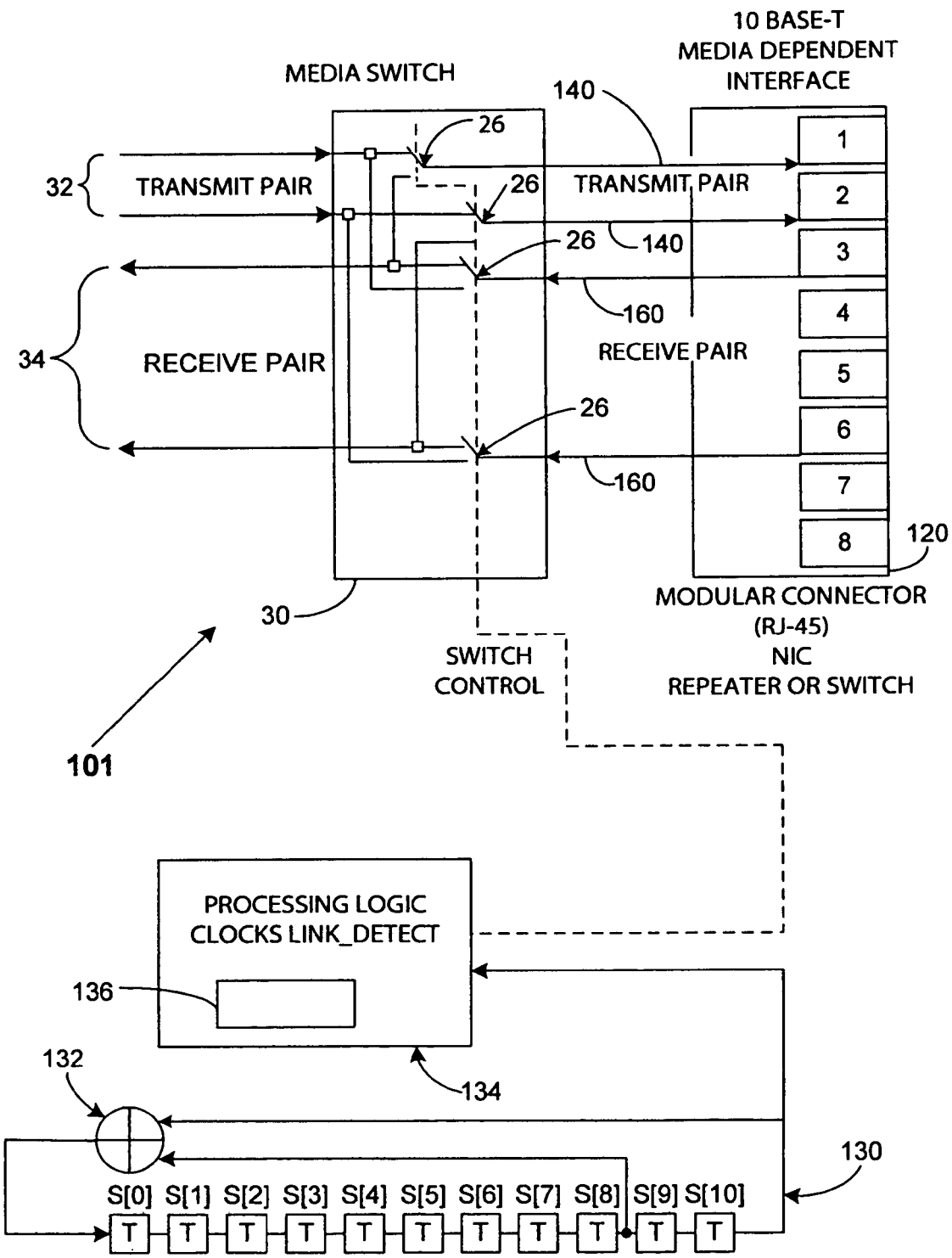
FIG. 3 is a schematic diagram of a network interface card coupled to a media switch, in accordance with an embodiment of the invention.

As shown in FIG. 3, in an embodiment of the invention, a hub (repeater or switch) 120 is shown on the right being connected via twisted pairs 140 and 160 to a media switch 30. The media switch 30 has twisted pairs 32 and 34 that can be connected to another node (not shown in FIG. 3) in the network. The pair 32 has arrows in the rightward direction indicating transmission of data to the right, while the pair 34 shows data transmission to the left. In an embodiment, the media switch 30 has four sets of contact 26 which in the position illustrated interconnect the pair 32 with the pins 1 and 2, the pair 34 to the pins 3 and 6. As illustrated, the four contacts 26 are adapted to be switched from the position as shown to the lower position responsive to a suitable controlling signal applied to the media switch 30. In the lower position, the hub 120 contacts 1 and 2 are connected to the twisted pair 34 and the contacts 3 and 6 are connected to the twisted pair 32. It should be apparent that the contact 26 of the media switch 30 will effectively switch the receive and transmit contacts between the pairs 32 and 34.

The decision to operate the switch 30 and change the contact position, as well as the timing thereof, is typically controlled by an 11-bit scrambler, generally indicated at 130, which is typically a linear feedback shift register. The shift register includes an exclusive OR gate 132 which generates a zero (0) if both inputs are equal and a one (1) if they are not equal. The inputs to the exclusive OR gate 132 are bits 8 and 10 of the shift register. The user can initially load the shift register with a set of values that may be any combination of ones and zeros with the exception that they cannot all be zeros. The scrambler 130 executes the polynomial $1+x^9+x^{11}$, and it will repeat its pseudo-random sequence every 2,048 clock cycles.

If there is a similar shift register in another media switch associated with a device that is on the other end of the link, then the possibility of both shift registers having the same value at any one time is 1 in $2^{22}$. While a shorter or longer shift register may be used, the illustrated 11 bit shift register that implements the above polynomial is also used to scramble data in the 100BASE-T specification and is therefore commonly available in the node devices being used. Since they are available, they can be used for the purpose of controlling the switching of the media switch 30. In essence, the shift register 130 has its $10^{th}$ bit connected to the exclusive OR gate 132 as well as to the control of the switch 30. When the $10^{th}$ bit is high or a 1, combined with other logic conditions as stated below, the switch is placed in a position opposite that shown in FIG. 3, and corresponding to the table of FIG. 4. Thus, contacts 1 and 2 will be connected to pair 34 and contacts 3 and 6 will be connected to pair 32.

A signal detector (in processor 134) can determine whether any link pulses, or technology signals are present at the receiver. The shift register 130 is typically clocked with a signal that is derived from a 25 MHZ clock with 100 parts-per-million accuracy, which is typically used for 100BASE-T and 10BASE-T devices. It should be understood that other clock frequencies may be used in the apparatus 101 with the operation of the network, if the reliability of consistently determining the presence of link pulses or link data is provided. The 25 MHZ clock develops a time unit that can conveniently be termed a "time slot" which is defined to be preferably about 55 milliseconds +−5%. This "time slot" duration is sufficiently long to insure accurate sampling of the link pulses which have a maximum spacing of about 26 milliseconds. The time slot duration is slightly more than twice the spacing of link pulses and thereby reliably insures that a link pulse will be detected, even though the relative timing of the shift registers of adjacent node devices may be slightly different.

Figure 6:
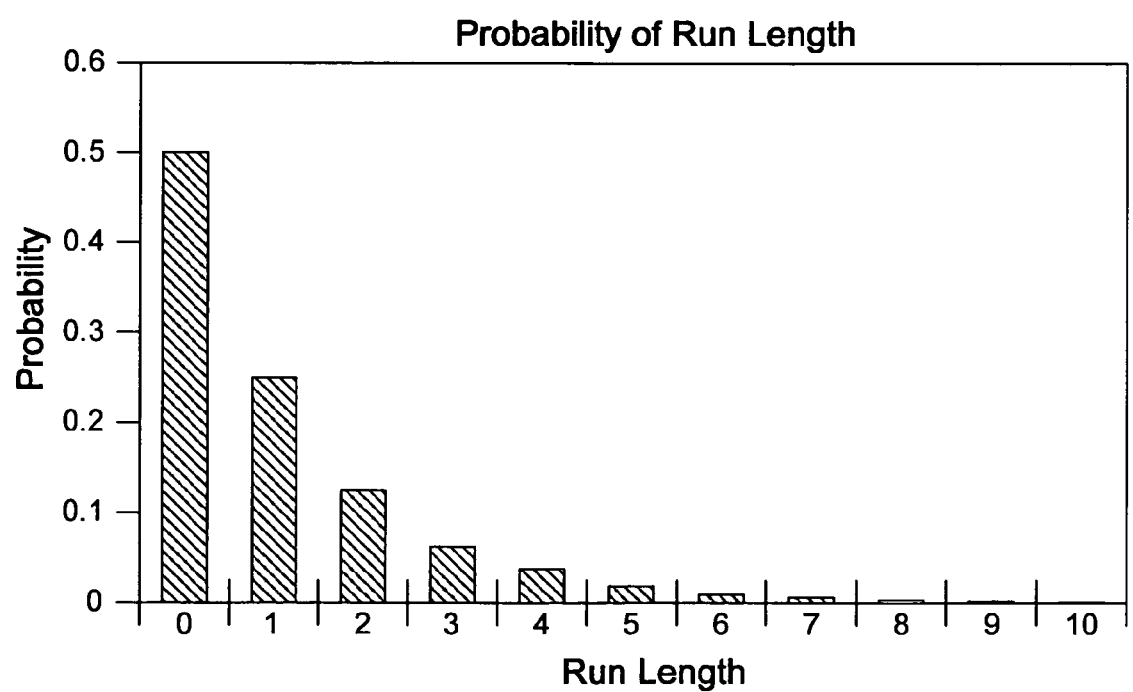
FIG. 6 is a chart illustrating the probability of not establishing a communication link versus time.

If an embodiment of the present invention is installed in a LAN where existing node devices that are not switched are present, the embodiment will properly configure the device so that two way communication will occur in about two time slots. However, if both devices are of the switching type and each includes the shift register 130, then the proper configuration of both devices will occur within 10 time slots. This is shown in the probability chart versus run length in time slots illustrated in FIG. 6.

The processor 134 is connected to the media switch 30 and the shift register 130. In an embodiment, the processor 134 includes a signal detector for detecting signals of predetermined threshold values on the twisted pairs 32 and 34 when connected to the switch 30. The processor 134 also typically includes a clock for clocking the shift register 130 as well as an analog free-running timer, identified as an A_timer, for resetting the apparatus 101 including the shift register 130. The shift register 130 reduces the probability of a lock step condition on the basis of two devices which have been initialized at different times.

If both devices have a shift register 130, then there is only a 1 in $2^{22}$ chance that both shift registers will be in the exact same state at the same time. This is the only condition in which a lock step situation may exist for two adjacent node devices. Other than this single instance, the two node devices are guaranteed to acquire a communication link within ten time slots as shown in the probability chart in FIG. 6. This is mandated by the fact that two 11 bit shift registers will not go more than 10 cycles in a row with equal values unless they are completely synchronized. Thus, the maximum time required for two node devices to establish a link is approximately 620 milliseconds. While the length of the shift register may be increased to reduce the probability of synchronization between nodes, the maximum link establishment time will be necessarily increased. The length of the shift register may also be reduced, but that would increase the probability that a lock step condition could occur.

The processor 134 may be a separate microprocessor or other types of processing devices such as a digital state machine and the like. The processor 134 may also be a special chip that incorporates the media switch 30 as well as the shift register 130. The shift register functionality may be implemented in the processor 134 rather than as an independent circuit as shown in the drawings, and the processor may be supplied by an interface processor that is part of the node device. Similarly, the node device may include signal detectors which will provide the necessary information to indicate when a communication link has been established or broken, in which case, the physical overhead for implementing an embodiment of the invention may be minimized, with the apparatus 101 operating with software routines of the type known to those skilled in the art given the description of the functionality that is provided herein.

Figure 5:
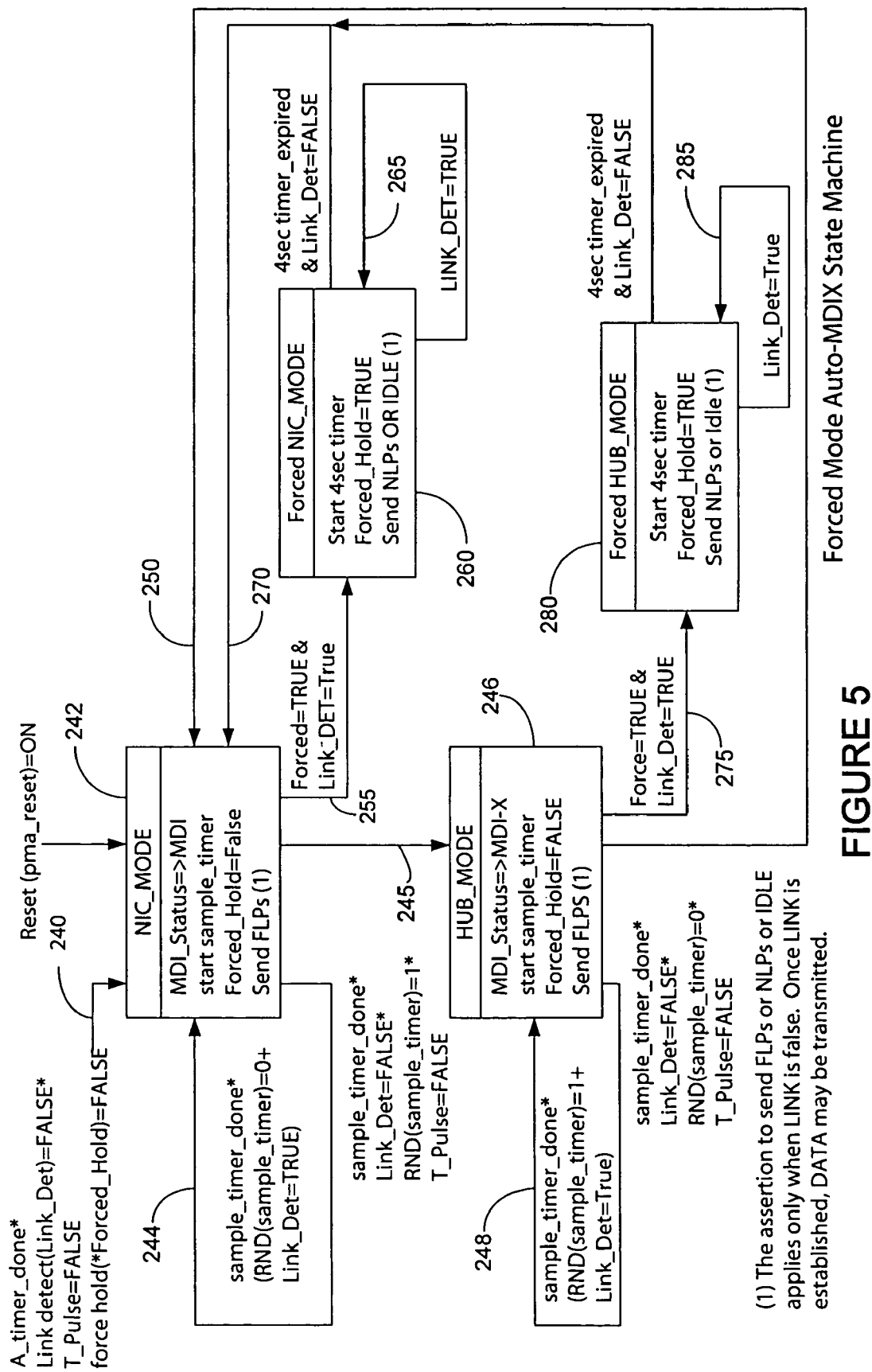
FIG. 5 is a state diagram illustrating an operation of an embodiment of the invention.

The logic used to operate an embodiment of the invention is illustrated by the state diagram shown in FIG. 5. It is noted that an analog one-shot timer (reset signal generator 136) may be used which acts to reset the state machine (which is typically in the processor 134 or implemented as the processor 134) after a long (relative to the state machine) time to provide a truly random interaction between nodes.

The processor 134 includes an A_timer which may be an analog timer that has a time base that is provided by a sloppy RC time constant so as to insure that every node device has a random component that is different from all others. Thus, this method provides wide disparity between devices and therefore reduces the probability of two nodes having an identical re-initialization time base. This is most easily achieved by the RC time constant and the timer times out, for example, approximately every 1.4 seconds, plus or minus 25%. The length of the time is sufficient to ensure that each end of the link will exercise its maximum run length in MDI and MDIX mode at least once.

It is noted that the signal, state, or mode names used to identify the signals, states, or modes in the drawings (e.g., A_timer_done*, NIC_MODE, HUB_MODE, Forced NIC_MODE, and the like) are only provided as some possible examples to identify the signals, states, or modes, and that other names may be used to identify the signals, states, or modes shown in the drawings and discussed in the text. When in the NIC_MODE (block 242), the switch control signal (from the processor 134) is set so that the media switch 30 causes the transmitter pair 32 to be directed to pins 1,2 and the receiver pair 36 to be directed to pins 3,6. The NIC_MODE 242 is entered when either the reset signal pma_reset is ON, or if the analog timer (~1.4 s) rolls over (as indicated by the "A timer_done*" signal) and Link_Detect is false and Forced_Hold is false. The Link_Detect signal is generated by the signal detector mechanism (which is typically configured within the processor 134), where the signal detection mechanism determines whether any link pulses (used for link establishment by 10BASE-T or 100BASE-T) are present at the receiver. The Link_Detect signal will be true if the received voltage at the input is, for example, greater than approximately 500 millivolts for a duration of, for example, greater than approximately 50 nanoseconds. The Forced_Hold signal is a created indicator that assists in defining the direction of flow through the state diagram in FIG. 5.

In the NIC_MODE initialization, it starts the sample timer (indicated by "start sample_timer") which is the clock that drives the shift register 130 and at the end of each "time slot" (where, a "time slot" is, e.g., about 55 milliseconds +−5%), the sample timer is done (indicated by "sample_timer_done*") and if the $10^{th}$ bit on the shift register 130 is a zero (indicated by "RND(sample_timer)=0") or the Link_Detect signal is true, then the apparatus 101 is maintained in the NIC_MODE 242 as diagrammatically shown by line 244.

If the Link_Detect signal is true, that is an indication that communication has been established. More specifically, the Link_Detect signal can be true based upon a number of criteria. One is that a link pulse is received. Another is if MLT3 data is received, which is basically the signaling for 100BASE-T technology. Another is if 10BASE-T signaling is received. Another is if a fast link pulse (FLP), which is a series of link pulses that are spaced closely together, is received. All of these types of signals can establish a true Link_Detect signal if the energies on the receiver exceed a certain threshold, for example, a voltage in excess of approximately 50 millivolts for a duration of more than approximately 50 nanoseconds.

If the apparatus is in the NIC_MODE 242 (i.e., a first state) and at the end of the sample timer slot (sample_timer_done*), the tenth bit of the shift register 130 is a one (1) (indicated by "RND(sample_timer)=1") and the Link_Detect signal is a false and a T-pulse is also false, the apparatus 101 will switch the media switch 30 (as shown by line 245) into the HUB_MODE (i.e., a second state) as shown by block 246. That will cause the sample timer to be started, which when done, will result in staying in the HUB_MODE 246 if the tenth bit of the shift register 130 is a one (1) or the Link_Detect signal is also true. If the tenth bit of the shift register 130 is a zero at the end of the sample timer time slot and Link_Detect is false and the T_Pulse is also false, the media switch 30 will switch back to the NIC_Mode 242 as shown by line 250. In all situations, when the Link_Detect signal is true, indicating that a communication link has been established, the logic then ignores the sample timer and the value of the tenth bit of the shift register 130 until the Link_Detect signal goes false.

With regard to the T_Pulse, it is a signal that is generated when something is being transmitted onto the wire pair. It is generated to preclude switching between NIC_MODE 242 and HUB_MODE 246 at that particular point in time. The reason for doing so is that if a switch between modes is performed in the middle of a pulse transmission, it is possible that a reflection of the pulse being transmitted could then come into the receiver because of the switch occurring in the middle of transmission. It could appear to the receiver that it detected something when in fact it was merely a reflection of the pulse that was transmitted. Thus, the T_Pulse is used to eliminate the probability of that pulse coming back and interfering with the receiver. The NIC_MODE 242 is the mode that the apparatus 101 initially establishes and is the mode that a reset will drive the apparatus to.

During operation, if a user were to unplug one of the pairs, the Link_Detect will go false. At that point, either the A_timer will have reset itself, which will cause the apparatus 101 to drop into the NIC_MODE 242 and start the sequence over again, or sample_timer will expire and depending on the value of the 10$^{th}$ bit of the shift register 130, the switch will either go back to NIC_MODE or move to the HUB_MODE. Since the A_timer is a free running timer, it outputs a pulse at the end of its time period of, for example, approximately 1.4 seconds. If A_timer is done (A_timer_done*), the Link_Detect signal is false, the T_pulse is false, and Forced_Hold is false, then the conditions for transitions (via line 240) are true and the state machine will go to the NIC_MODE 242 state. When the Link_Detect signal is false, the sample timer would very likely be done within approximately 62 milliseconds and then depending upon the value of the tenth bit of the shift register 130, would either switch to the other mode (HUB_MODE or state 246) or not.

Fast Link Pulses (FLPs) are transmitted in the Auto-Negotiation Protocol. Most PHY (Physical Layer) IC (Integrated Circuit) designs will send out either NLPs or scrambled IDLE symbols (signals) when they have been place in Forced Mode. To operate properly, the PHY should send out FLPs, which advertise the speed and duplex capability that it shall be forced into. When the Auto-MDI/MDIX state machine (as defined by the state diagram in FIG. 5) locks (i.e., Link_Detect=TRUE), the PHY will begin transmitting either NLPs (Normal Link Pulses–10BASE-T) or scrambled IDLE symbols (100BASE-TX) for at least 4 seconds, as described below. By sending this information for at least 4 seconds, the auto-negotiating (AN) node at the other end of the link will be able to properly perform its "parallel detect" function and bring the link up. If the other end of the link is unable to link within 4 seconds, then a fault has occurred, and the Auto-MDI/MDI-X function should resume from the beginning at NIC_MODE 242.

It should be noted that the value of Link_Detect is cleared (set to FALSE) upon the transition into any of the above states and is latched (held TRUE) if it ever occurs while in a state. The Forced_Hold variable is designed to over-ride the 1.4 second A_timer that might expire during the time that the auto-negotiating (AN) node on the other end of the link is quiet and preparing to parallel detect.

As shown in the state diagram in FIG. 5, in NIC_MODE 242 and in the HUB_MODE 246, when Forced_Hold is false, there is authorization to send FLPs, and the FLPs are sent based upon the auto-negotiating timers. It is noted that in FIG. 5, the assertion to send FLPs or NLPs or IDLE applies only when the Link_Detect is false. Once link is established, data may be transmitted across the link.

As also shown in the state diagram in FIG. 5, in NIC_Mode 242, when Force Mode becomes true ("Forced=TRUE" and Link_Detect is true ("Link_Det=TRUE"), there will be a transition 255 into a Forced NIC_MODE 260. A timer of, for example, 4 seconds is started and Forced_Hold is set to true and NLPs or IDLE signals are transmitted. NLPs are 10 megabit pulses where only a single pulse is transmitted. IDLE is a scrambled 100BASE-T signal. Even if the 4-second timer has expired, as long as Link_Detect is true (signal is being received from the other end of link), the state will remain in the Forced NIC_Mode 260 as shown by line 265. This permits the state to remain in Forced NIC_MODE 260 when NLPs or IDLE are sent to the other end of the link and when the other end of the link is allowed remain silent after receiving the NLPs or IDLE. If the 4-second timer has expired and Link_Detect is false (no signal is being received from the other end of the link), then the state will transition back to the NIC_MODE 242 as shown by line 270. Thus, when the apparatus 101 is in a Forced state, there can be a negotiation for the HUB_MODE 246 state.

In HUB_MODE 246, when Force Mode becomes true and Link_Detect is true, there will be a transition 275 into a Forced HUB_MODE 280. A timer of, for example, 4 seconds is started and Forced_Hold is set to true and NLPs or IDLE signals are transmitted. Even if the 4-second timer has expired, as long as Link_Detect is true (signal is being received from the other end of link), the state will remain in the Forced HUB_MODE 280 as shown by line 285. If the 4-second timer has expired and Link_Detect is false (no signal is being received from the other end of the link), then the state will transition back to the NIC_MODE 242 as shown by line 270.

Software Embodiment

Figure 7:
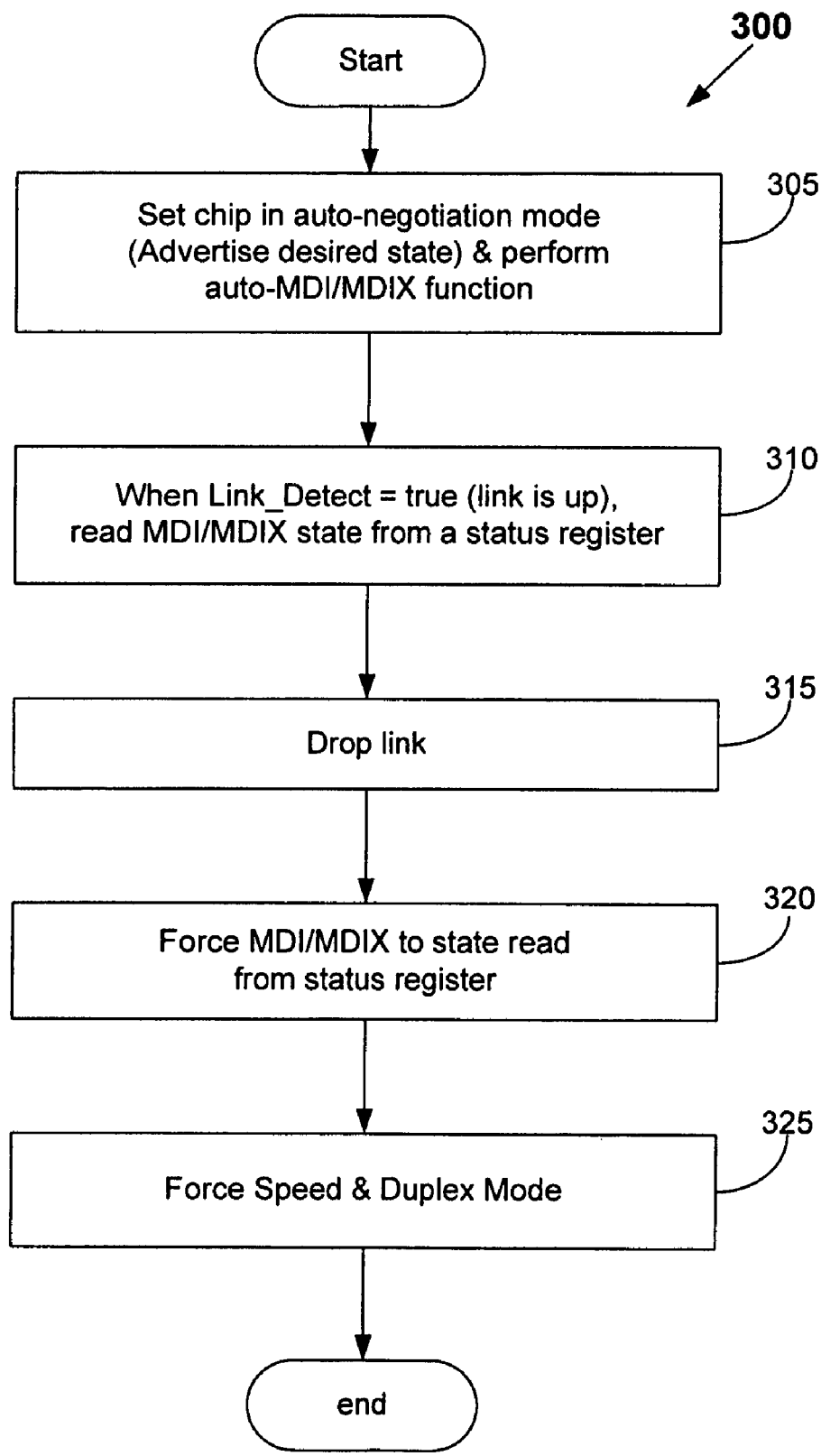
FIG. 7 is a flowchart illustrating a method in accordance with another embodiment of the invention.

FIG. 7 is a flowchart of a method 300 of using an existing auto-MDI/MDIX function when operating in Forced speed and duplex mode. The method 300 may be typically enabled by the software executed by components or chip in the processor 134. In action (305), a chip is first set in the auto-negotiation mode, and the desired state is advertised. The chip can now perform its auto-MDI/MDIX function. When the Link_Detect signal is true (the link is up), the MDI/MDIX state is read (310) from a status register in the chip where the MDI/MDIX state indicates the state of the other end of the link. The status register may, for example, typically be implemented in the processor 134. The link is then dropped (forced down) (315) by the chip. The chip will then force (320) the MDI/MDIX state to the state found in the status register. The other end of the link will be in the other MDI/MDIX state. The chip will then force (325) its speed and duplex mode, and the other end of the link will force its speed and duplex mode. If the other end of the link is fixed, then there will be immediate linking of both ends. If in the auto MDI/MDIX function, then both ends will link within about 2 cycles. If the other end of the link includes the above software embodiment, then both ends will link immediately and both ends will force the MDI/MDIX state.

The embodiments mentioned above for determining the state of the crossover is not limited to Ethernet applications. The method can be used for example, in Firewire, Infiniband, Token Ring, or other suitable technologies. While the examples shown are directed towards the IEEE 802.3 and IEEE 802.3u standards, the methods described herein may be used with other technologies and media than those shown. The conditions for Link_detect and timer values may differ.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or actions will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of automatically configuring media connections, the method comprising:
    connecting a first pair of connectors for data transmission and a second pair of connectors for data reception during a first state, and connecting the first pair of connectors for data reception and the second pair of connectors for data transmission during a second state; and
    generating a controlling signal for selecting the first state and the second state, wherein the controlling signal has one of first and second values during each time period, and wherein the values change in a pseudo-random manner.

2. The method of claim 1 wherein the first pair and second pair of connectors are in a node interface device.

3. The method of claim 1, further comprising:
    detecting link data transmission in one of the pairs of connectors; and
    inhibiting an alternating between the first state and the second state in response to link data transmission that is detected in one of the pairs of connectors.

4. The method of claim 1, wherein the controlling signal is received by a media switch.

5. The method of claim 4,
    wherein the controlling signal is generated by a scrambler.

6. An article of manufacture, comprising:
    a machine-readable medium having stored thereon instructions to:
    connect a first pair of connectors for data transmission and a second pair of connectors for data reception during a first state, and connect the first pair of connectors for data reception and the second pair of connectors for data transmission during a second state; and
    generate a controlling signal for selecting the first state and the second state, wherein the controlling signal has one of first and second values during each time period, and wherein the values change in a pseudo-random manner.

7. An apparatus for automatically configuring media connections, the apparatus comprising:
   means for connecting a first pair of connectors for data transmission and a second pair of connectors for data reception during a first state, and connecting the first pair of connectors for data reception and the second pair of connectors for data transmission during a second state; and
   means for generating a controlling signal for selecting the first state and the second state, wherein the controlling signal has one of first and second values during each time period, and wherein the values change in a pseudo-random manner.

8. An apparatus for automatically configuring media connections, the apparatus comprising:
   a media switch configured to connect a first pair of connectors for data transmission and a second pair of connectors for data reception during a first state, and to connect the first pair of connectors for data reception and the second pair of connectors for data transmission during a second state; and
   a processor coupled to the media switch and configured to generate a controlling signal for selecting the first state and the second state, wherein the controlling signal has one of first and second values during each time period, and wherein the values change in a pseudo-random manner.

9. The apparatus of claim 8, further comprising:
   a scrambler coupled to the processor and configured to generate an output for use by the processor to determine a transition between the first state and the second state.

10. The apparatus of claim 9, wherein the scrambler is an 11 bit shift register.

11. The apparatus of claim 8, wherein the first pair and second pair of connectors are in a node interface device.

12. The apparatus of claim 8, wherein the processor detects link data transmission in one of the pairs of connectors and inhibits an alternating between the first state and the second state in response to link data transmission that is detected in one of the pairs of connectors.

13. The apparatus of claim 8, wherein the controlling signal is received by the media switch.

14. The apparatus of claim 8, wherein the scrambler comprises a linear feedback shift register.

15. A method for configuring network media connections, the method comprising:
   in a first mode, permitting a first pair of connectors to receive data and a second pair of connectors to transmit data;
   in a second mode, permitting the first pair of connectors to transmit data and the second pair of connectors to receive data; and
   generating a controlling signal for selecting the first mode and the second mode, wherein the controlling signal has one of first and second values during each time period, and wherein the values change in a pseudo-random manner.

16. The method of claim 15, wherein the data includes link pulses in a packet format.

17. The method of claim 15, wherein the data includes information in a packet format.

18. The method of claim 15, wherein the first pair and second pair of connectors are in a node interface device.

19. The method of claim 15, further comprising:
   alternating between the first mode and the second mode.

20. The method of claim 19, wherein the alternating between the first mode and the second mode occurs in a pseudo-random manner.

21. The method of claim 15, further comprising:
   detecting link data in one of the pairs of connectors; and
   inhibiting an alternating between the first mode and the second mode in response to detection of the link data.

22. The method of claim 15, further comprising:
   producing a controlling signal to set one of the first mode and the second mode.

23. The method of claim 22, wherein the controlling signal includes one of a first value and a second value during each time period.

24. The method of claim 23, wherein said each time period is constant and predetermined.

25. The method of claim 23, wherein the time period comprises a pseudo-random number of time units.

26. The method of claim 23, wherein said each time period is within a range of about 50 milliseconds and about 60 milliseconds.

27. The method of claim 23, wherein the controlling signal changes between the first value and the second value in a pseudo-random manner.

28. The method of claim 27, wherein the controlling signal changes between the first value and the second value during a time period between about 60 milliseconds to about 600 milliseconds.

29. The method of claim 27, wherein the controlling signal changes between the first value and the second value during a time period between about 1 millisecond to about 60 milliseconds.

30. The method of claim 27, wherein the controlling signal changes between the first value and the second value during a time period within a range between about 1 millisecond to about 600 milliseconds.

31. The method of claim 22, wherein the controlling signal is received by a media switch.

32. The method of claim 31, wherein the media switch includes a plurality of parallel transmitters and receivers.

33. The method of claim 31, wherein the media switch includes a plurality of switch contacts.

34. An apparatus for configuring network media connections, the apparatus comprising:
   a node interface;
   a switch configured to permit a first pair of connectors in the node interface to receive data and a second pair of connectors in the node interface to transmit data in a first mode, and to permit the first pair of connectors to transmit data and the second pair of connectors to receive data in a second mode; and
   a processor configured to generate a controlling signal for selecting the first mode and the second mode, wherein the controlling signal has one of first and second values during each time period, and wherein the values change in a pseudo-random manner.

35. The apparatus of claim 34, wherein the data includes link pulses in a packet format.

36. The apparatus of claim 34, wherein the data includes information in a packet format.

37. The apparatus of claim 34, wherein the first pair and second pair of connectors are in a node interface device.

38. The apparatus of claim 34, wherein the switch is configured to alternate between the first mode and the second mode.

39. The apparatus of claim 38, wherein the switch is configured to alternate between the first mode and the second mode occurs in a pseudo-random manner.

40. The apparatus of claim 34, further comprising:
a detector configured to inhibit an alternating between the first mode and the second mode in response to detection of link data in one of the pairs of connectors.

41. The apparatus of claim 34, further comprising:
a signal generator configured to produce a controlling signal to set one of the first mode and the second mode.

42. The apparatus of claim 41, wherein the controlling signal includes one of a first value and a second value during each time period.

43. The apparatus of claim 42, wherein said each time period is constant and predetermined.

44. The apparatus of claim 42, wherein the time period comprises a pseudo-random number of time units.

45. The apparatus of claim 42, wherein said each time period is within a range of about 50 milliseconds and about 60 milliseconds.

46. The apparatus of claim 42, wherein the controlling signal changes between the first value and the second value in a pseudo-random manner.

47. The apparatus of claim 46, wherein the controlling signal changes between the first value and the second value during a time period between about 60 milliseconds to about 600 milliseconds.

48. The apparatus of claim 46, wherein the controlling signal changes between the first value and the second value during a time period between about 1 millisecond to about 60 milliseconds.

49. The apparatus of claim 46, wherein the controlling signal changes between the first value and the second value during a time period within a range between about 1 millisecond to about 600 milliseconds.

50. The apparatus of claim 41, wherein the switch receives the controlling signal.

51. The apparatus of claim 34, wherein the switch includes a plurality of parallel transmitters and receivers.

52. The apparatus of claim 51, wherein the plurality of parallel transmitter and receivers comprises a first transmitter, a second transmitter, a first receiver, and a second receiver;
wherein the first receiver is configured to permit the first pair of connectors to receive data and the first transmitter is configured to permit the second pair of connectors to transmit data in the first mode; and
wherein the second transmitter is configured to permit the first pair of connectors to transmit data and the second transmitter is configured to permit the second pair of connectors to receive data in the second mode.

53. The apparatus of claim 34, wherein the switch includes a plurality of switch contacts.

54. The apparatus of claim 53, wherein the plurality of switch contacts comprises a first contact, a second contact, a third contact, and a fourth contact;
wherein the first contact is configured to permit the first pair of connectors to receive data and the second contact is configured to permit the second pair of connectors to transmit data in the first mode; and
wherein the third contact is configured to permit the first pair of connectors to transmit data and the fourth contact is configured to permit the second pair of connectors to receive data in the second mode.

55. An apparatus for configuring network media connections, the apparatus comprising:
means for permitting a first pair of connectors in a node interface to receive data and a second pair of connectors in the node interface to transmit data in a first mode, and for permitting the first pair of connectors to transmit data and the second pair of connectors to receive data in a second mode;
wherein the permitting means is configured to alternate between the first mode and the second mode; and
means for generating a controlling signal for selecting the first mode and the second mode, wherein the controlling signal has one of first and second values during each time period, and wherein the values change in a pseudo-random manner.

56. The apparatus of claim 55, wherein the permitting means is configured to alternate between the first mode and the second mode in a pseudo-random manner.

57. The apparatus of claim 55, wherein the data includes link pulses in a packet format.

58. The apparatus of claim 55, wherein the data includes information in a packet format.

59. The apparatus of claim 55, wherein the first pair and second pair of connectors are in a node interface device.

60. The apparatus of claim 55, wherein the permitting means is configured to inhibit an alternating between the first mode and the second mode in response to detection of link data in one of the pairs of connectors.

61. The apparatus of claim 55, wherein the permitting means is configured to produce a controlling signal to set one of the first mode and the second mode.

62. The apparatus of claim 61, wherein the controlling signal includes one of a first value and a second value during each time period.

63. The apparatus of claim 62, wherein said each time period is constant and predetermined.

64. The apparatus of claim 62, wherein the time period comprises a pseudo-random number of time units.

65. The apparatus of claim 62, wherein said each time period is within a range of about 50 milliseconds and about 60 milliseconds.

66. The apparatus of claim 62, wherein the controlling signal changes between the first value and the second value in a pseudo-random manner.

67. The apparatus of claim 66, wherein the controlling signal changes between the first value and the second value during a time period between about 60 milliseconds to about 600 milliseconds.

68. The apparatus of claim 66, wherein the controlling signal changes between the first value and the second value during a time period between about 1 millisecond to about 60 milliseconds.

69. The apparatus of claim 66, wherein the controlling signal changes between the first value and the second value during a time period within a range between about 1 millisecond to about 600 milliseconds.

70. The apparatus of claim 55, wherein the permitting means includes a plurality of parallel transmitters and receivers.

71. The apparatus of claim 70, wherein the plurality of parallel transmitter and receivers comprises a first transmitter, a second transmitter, a first receiver, and a second receiver;
wherein the first receiver is configured to permit the first pair of connectors to receive data and the first transmitter is configured to permit the second pair of connectors to transmit data in the first mode; and
wherein the second transmitter is configured to permit the first pair of connectors to transmit data and the second transmitter is configured to permit the second pair of connectors to receive data in the second mode.

72. The apparatus of claim 55, wherein the permitting means includes a plurality of switch contacts.

73. The apparatus of claim 72, wherein the plurality of switch contacts comprises a first contact, a second contact, a third contact, and a fourth contact;

wherein the first contact is configured to permit the first pair of connectors to receive data and the second contact is configured to permit the second pair of connectors to transmit data in the first mode; and wherein the third contact is configured to permit the first pair of connectors to transmit data and the fourth contact is configured to permit the second pair of connectors to receive data in the second mode.

\* \* \* \* \*